Oct. 3, 1972 G. H. ERB 3,695,976
APPARATUS FOR MANUFACTURING OF SEPARABLE
FASTENER ELEMENTS
Original Filed June 22, 1967 6 Sheets-Sheet 6

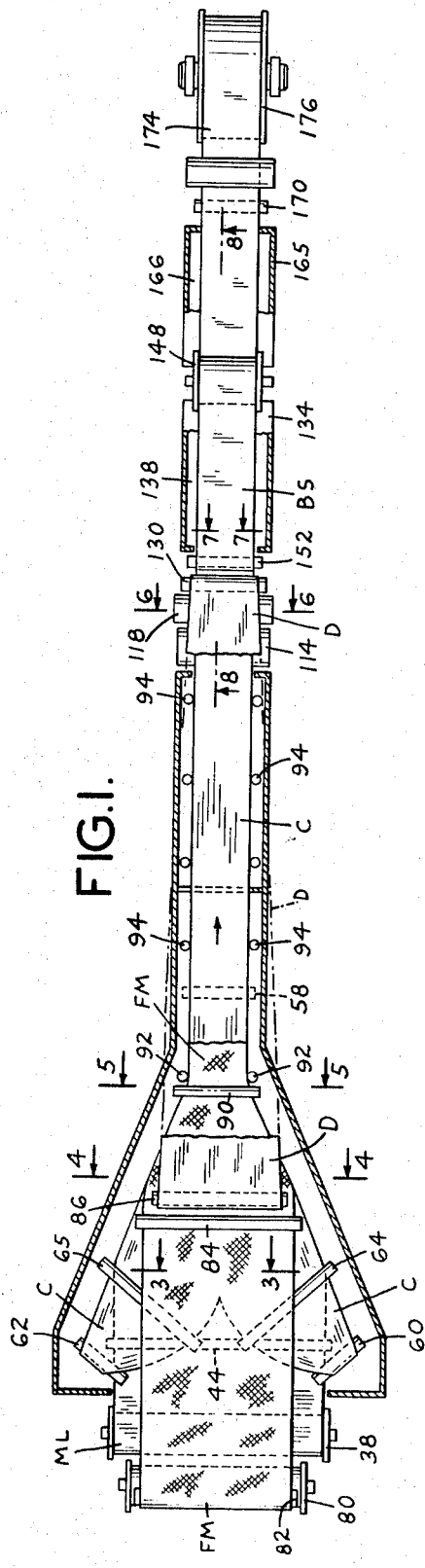

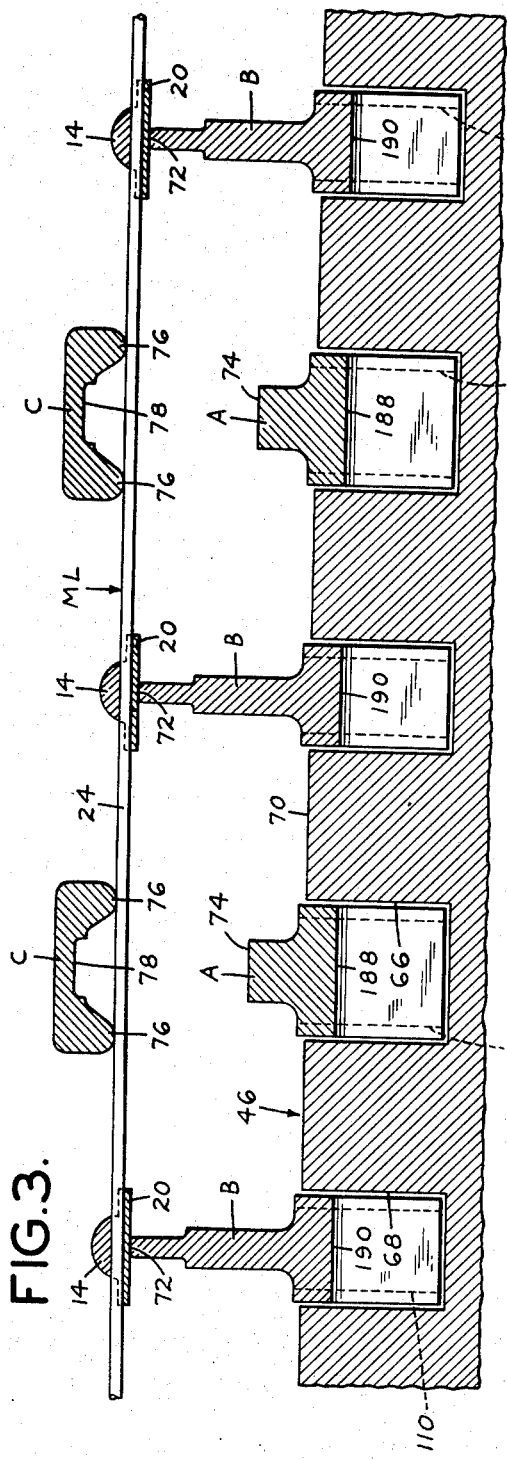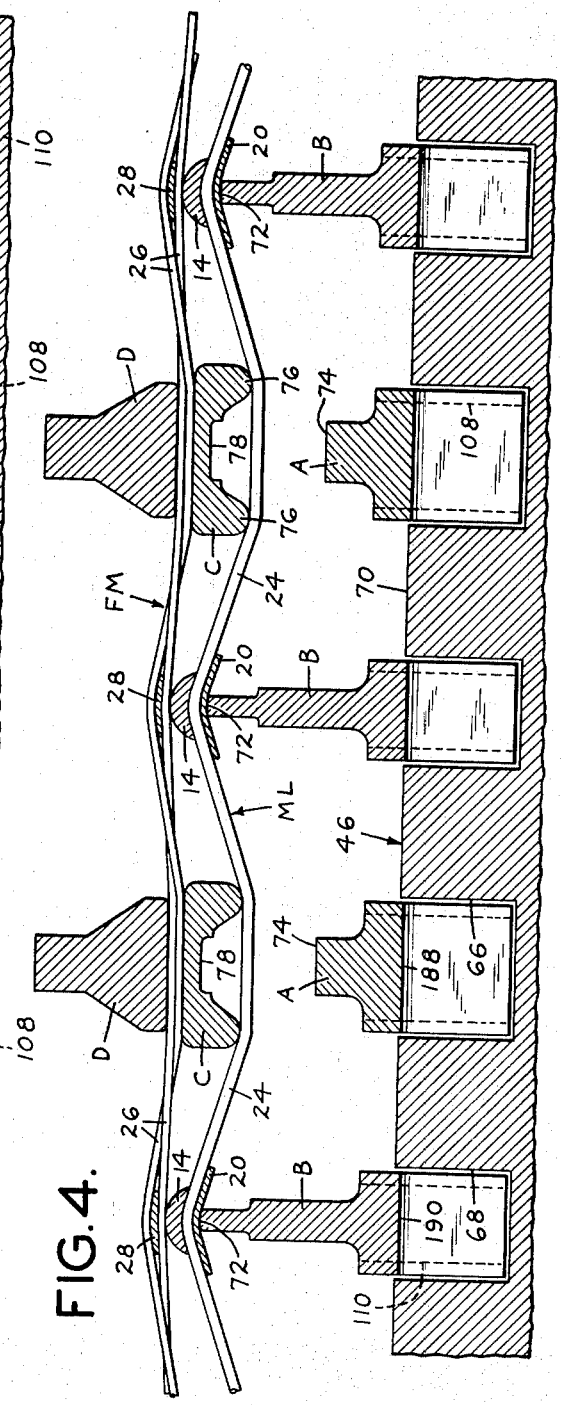

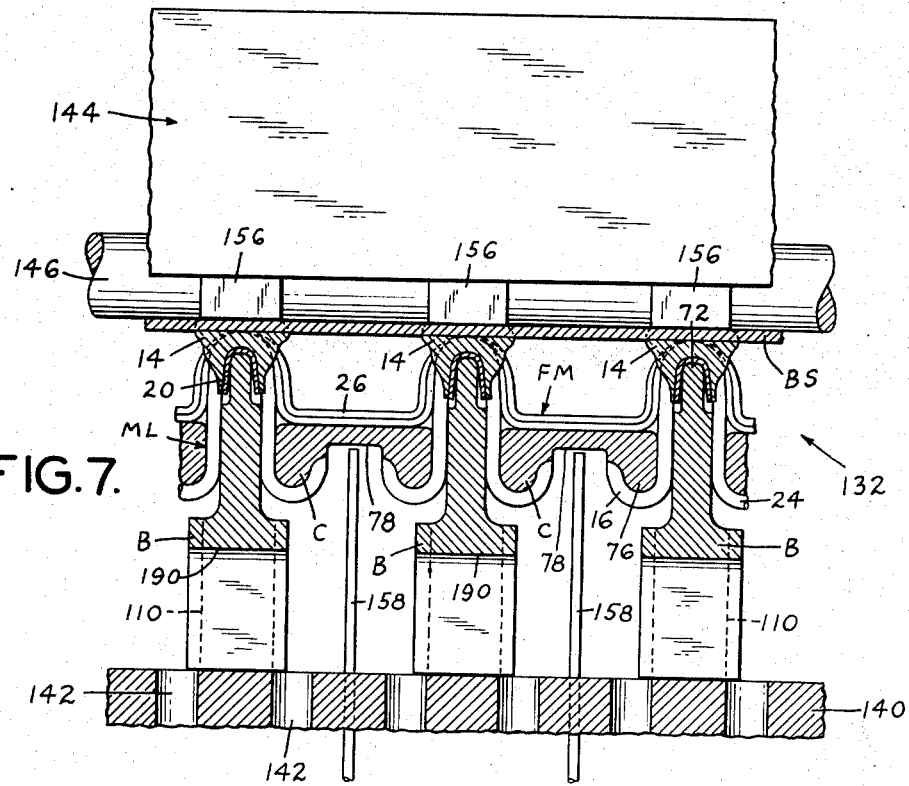
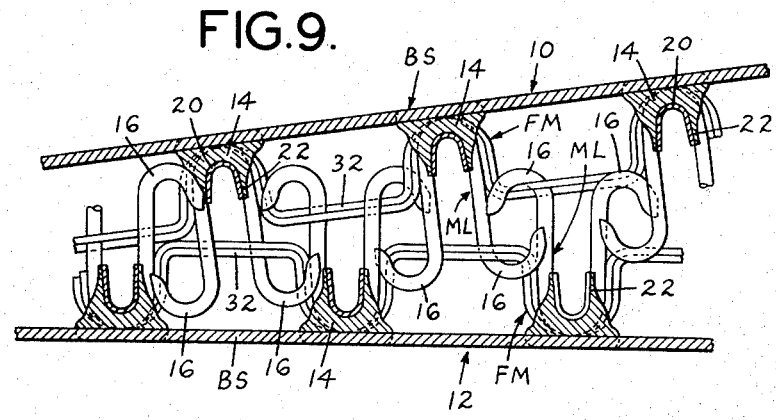

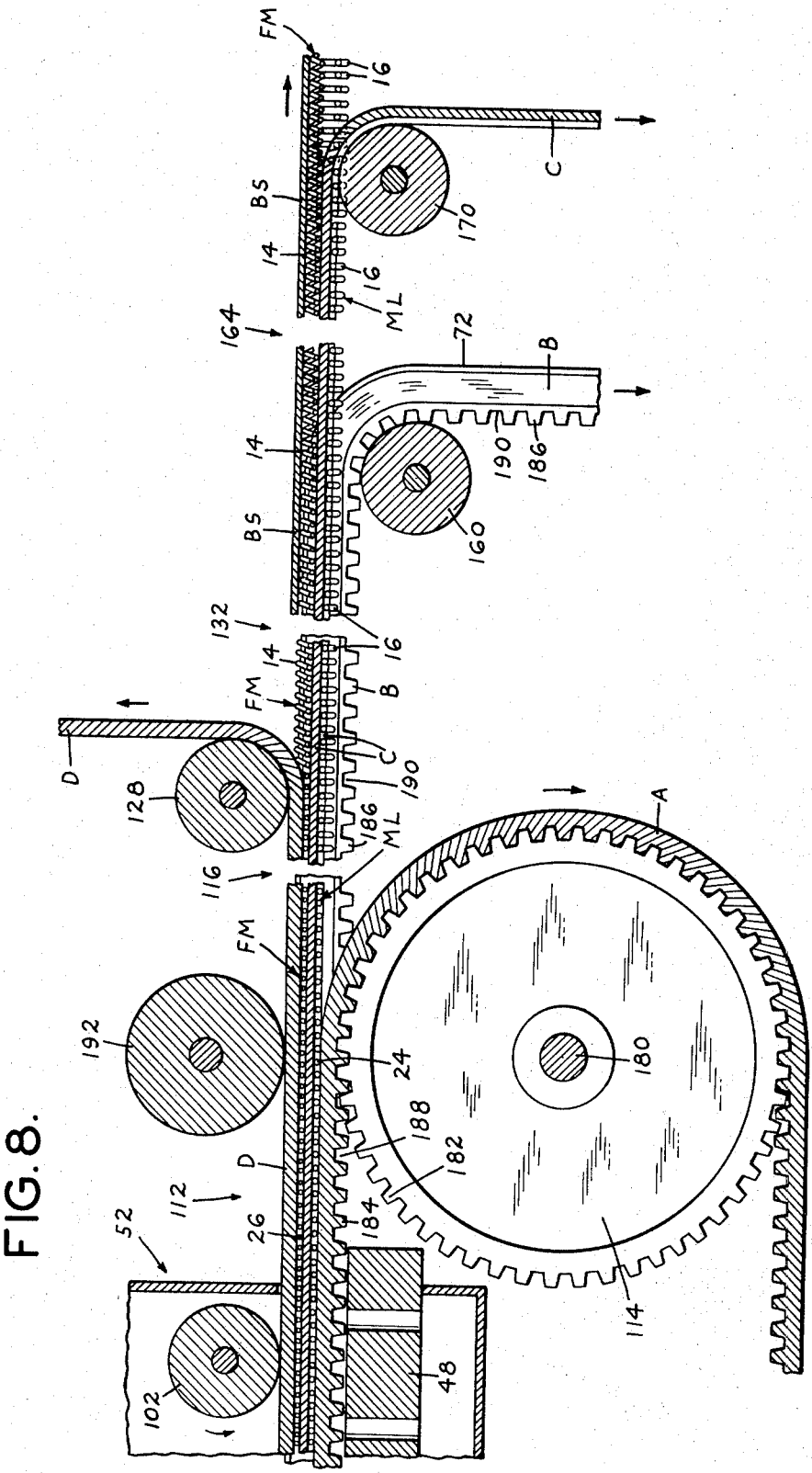

United States Patent Office 3,695,976
Patented Oct. 3, 1972

3,695,976
APPARATUS FOR MANUFACTURING OF SEPARABLE FASTENER ELEMENTS
George H. Erb, Cuttingsville, Vt., assignor to Velcro S.A., Nyon, Switzerland
Original application June 22, 1967, Ser. No. 648,118, now Patent No. 3,562,770, dated Feb. 9, 1971. Divided and this application May 21, 1970, Ser. No. 39,467
Int. Cl. D04h 11/08; A14b 17/00
U.S. Cl. 156—435
7 Claims

ABSTRACT OF THE DISCLOSURE

A three level hermaphrodite separable fastener element having a flexible base sheet, a large number of closely spaced flexible and resilient hooks secured to and extending vertically from the base sheet and a network of criss-crossed, relatively movable, flexible, resilient strands secured to the base sheet and lying in a plane between the open ends of the hooks and the backing sheet. When two such fastener elements are pressed together to form a closure the hooks of each element become enmeshed with the strands of the other. Also, apparatus for continuous forming of such fastened element from three continuous prefabricated webs of hook-forming, mesh-forming and base sheet-forming materials respectively. The apparatus includes multiple sets of shaped metal bands which converge with the hook-forming and mesh-forming webs, longitudinally corrugating the webs and holding them in predetermined shape while being heat set and secured to the base-sheet-forming web.

FIELD AND BACKGROUND OF THE INVENTION

This application is a division of application Ser. No. 648,118 filed June 22, 1967, now Pat. No. 3,562,770.

The separable fastener elements of the present invention are similar in many respects to the fasteners sold under the registered trademark "Velcro" and manufactured in accordance with U.S. Pats. Nos. 2,717,437 and 3,009,235 to De Mestral. While such Velcro fasteners are usually woven on ribbon looms and usually comprise a hooking ribbon and a loop pile ribbon with which the hooking ribbon cooperates to form a closure, the fastening element of the present invention is formed on continuously moving tools consisting of endless metal bands and the element thus formed is hermaphroditic in that it has both hooking and hook-enmeshing parts whereby identical fastening elements may be brought together to form a firm but separable closure.

U.S. Pat. No. 3,130,111 to Izumi shows a hermaphordite fastener of a type which may be woven on a ribobn loom and in which the hooks and loops lie substantially in the same plane. The fastener of the present invention may be manufactured much more rapidly and at less expense than the fastener of the Izumi patent. Also, the hooking devices of the present invention protrude outwardly beyond the plane of the hook enmeshing parts whereby there is no danger of the hooking and enmeshing parts of a fastener element becoming entangled with themselves as is possible in the Izumi fastener element.

The apparatus of the present invention is useful not only for the manufacture of hermaphrodite fastener elements but also for the manufacture of fastener elements having either hooking devices or hook enmeshing parts alone as may be desired.

U.S. Pat. No. 3,277,547 to Billerant discloses a machine for the continuous production of fastener elements of the hooking type in which spaced, parallel monofilaments are arranged in a sheet and are tranvsersely corrugated to establish a pile conformation after which a base sheet is extruded as a film onto the formed monofilaments.

SUMMARY OF THE INVENTION

In contrast with the prior art the present invention affords a three level hermaphrodite fastener element in which the base sheet may be woven, non-woven or film material, and may be porous or non-porous as desired. The base sheet is in the form of a web prefabricated in any desired manner. Thus it may be supplied with a coating of potentially adhesive material on the side opposite to that to which the hooking and meshing elements are secured whereby the final product is ready to be attached to a surface by activation of the adhesive,. Also, the base sheet may have indicia printed thereon such as identifying symbols or instructions for use.

The hooking parts of the fastener are formed of heat settable synthetic monofilaments such as nylon and they are secured to the base sheet by being embedded in continuous strips of adhesive material thus being much more firmly secured than is the case when hooking elements are spot welded or spot "glued" as has been suggested in the past. The hooking parts are formed in rows extending longitudinally of the base sheet and preferably are disposed in opposed directions generally transversely of the rows to give holding power which is approximately equal in both directions cross-wise of the fastener. This is of great importance when the fastener is used in the form of elongated strips, to close a seam for example, with the greatest strain frequently being in the cross-wise direction.

The hook enmeshing parts of the fastener element of the present invention lie in a plane between the open ends of the hooks and the base fabric, and are made up of criss-crossed monofilaments, such as nylon, forming a lattice-like mesh of closely spaced and relatively movable strands. The spacing of the strands is such as to form openings which are somewhat smaller than the projected lateral dimensions of the hooks which, when two elements are pressed together, must penetrate the mesh by moving adjacent strands apart. After penetration by the hooks the strands of the mesh will spring back to securely entrap the hooks.

The apparatus for forming the fastener element of the present invention is adapted for operation on prefabricated webs, a male web made up of hook forming monofilaments extending transversely of and secured to strips of adhesive material and a female web made up of criss-crossed strands of monofilaments which extend diagonally across and are secured to strips of adhesive material. The prefabricated webs thus somewhat resemble woven fabrics with adhesive strips as warps and monfilaments as wefts.

The prefabricated webs are supplied to the machine in full flat width and are placed in registry with endless metal bands which are laterally spaced to register with the adhesive strips of the webs and the bands are then caused to converge thus progressively narrowing the webs and forming longitudinally extending corrugations therein. When the bands have converged to final position the adhesive strips of the webs are softened by heat and the heat-settable monofilaments are heat set in corrugated shape. Portions of the male web monofilaments are cut away to leave hook shaped pieces secured to the adhesive strips. The female web is flattened out between alhesive strips to form a mesh at a level below the hooks. The assembly is then adhesively secured to a prefabricated base web and the final product is cooled and wound upon a reel.

DESCRIPTION OF THE DRAWINGS

FIG. 1 is a diagrammatic plan view of a machine embodying the present invention, with certain parts in section and other parts omitted or broken away or shown in section, the parts in section being taken along a plane lying generally below hold down rolls 90, 100 shown in FIG. 2;

FIG. 2 is a diagrammatic vertical sectional view taken generally along the longitudinal centerline of the machine shown in FIG. 1;

FIG. 3 is a greatly enlarged vertical sectional view taken along the line 3—3 in FIG. 2;

FIGS. 4, 5, 6 and 7 are sectional views similar to FIG. 3 and taken respectively along the lines 4—4, 5—5, 6—6 and 7—7 of FIG. 2;

FIG. 8 is a greatly enlarged vertical sectional view taken along the line 8—8 in FIG. 1, with parts omitted and with certain parts enlarged to a much greater degree than others;

FIG. 9 is a greatly enlarged fragmentary vertical sectional view of two pieces of the completed product of the present invention, illustrating the manner in which such pieces interengage when pressed together in use;

DESCRIPTION OF THE PREFERRED EMBODIMENTS

Figure 5:
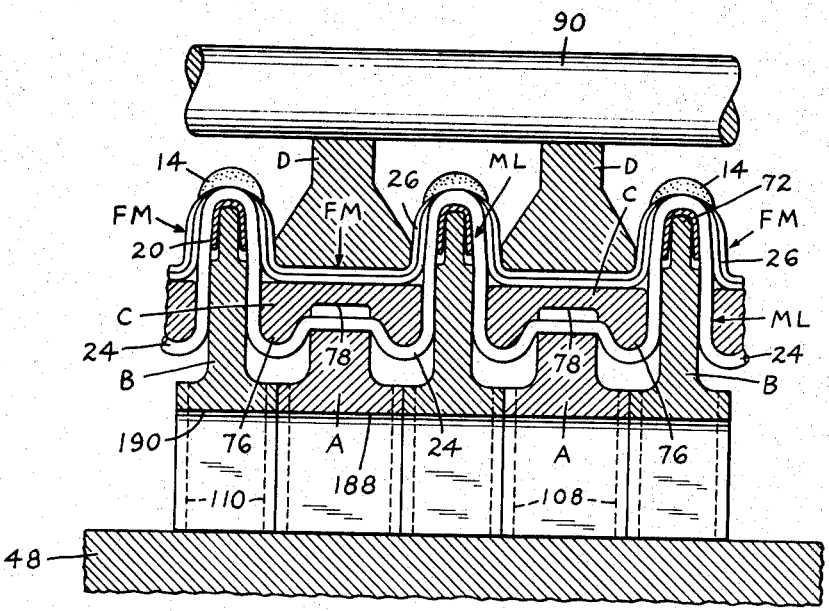

A preferred embodiment of a machine for the manufacture of the separable fastener of the present invention is shown in FIGS. 1 through 8. A preferred embodiment of the completed fastener element of the present invention is shown in FIG. 9 wherein one such element is shown in the act of interlocking with another identical element. The prefabricated components of the fastener element are shown in FIGS. 10 through 13.

Referring first to FIG. 9 the two completed fastener elements are indicated at 10 and 12 respectively. Each element 10 and 12 comprises a flexible backing sheet BS, which may be a strong woven fabric or a sheet of flexible plastic material. Elongated beads of thermoplastic resinous material 14 serve to secure a female web FM and a male web ML to the backing sheet. The male web ML has been cut, as will be described hereinbelow, to form oppositely displaced pairs of male hooks 16.

Referring now to FIGS. 10 through 13, FIG. 10 shows the prefabricated male web ML prior to its incorporation into a fastener element such as either of those shown in FIG. 9. This prefabricated web is made up of lengthwise extending narrow ribbons 20, preferably formed of nylon film, on each of which there is formed the bead 14 of thermoplastic resinous material shown in the fastener elements 10 as illustrated in FIG. 9.

Figure 11:
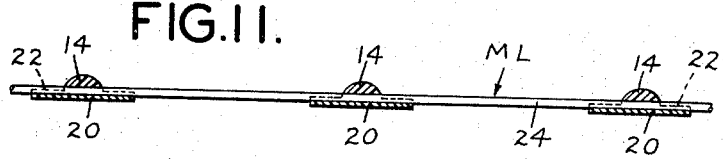
FIG. 11 is a vertical sectional view along the line 11—11 of FIG. 10.

Referring now to FIG. 11, the beads 14 are formed integrally with a layer 22 of the same thermoplastic material which is adhered to the nylon strip 20. The beads 14 and layers 20 preferably are made of a thermoplastic material such as Versalon 1165 supplied by General Mills. This is a polyamide hot-melt adhesive available in a form which softens at a temperature below the heat softening temperature of the nylon strips 20.

Figure 10:
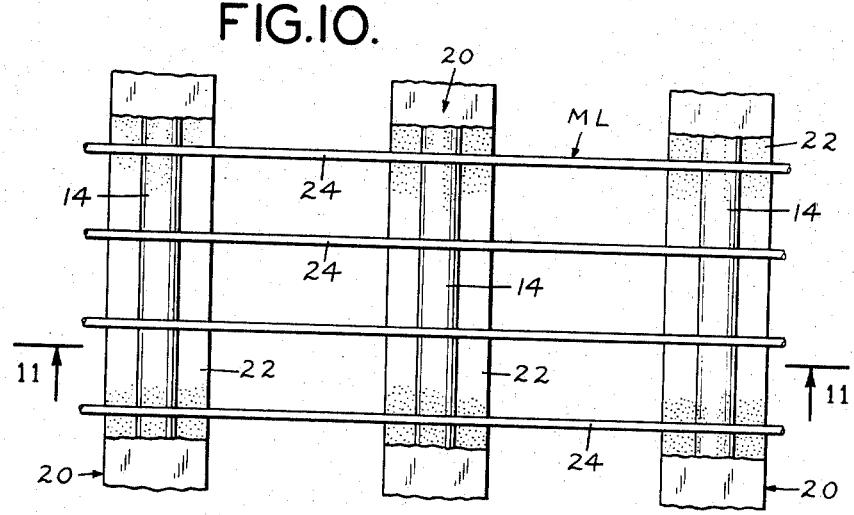
FIG. 10 is a greatly enlarged fragmentary plan view of a prefabricated web of hook-forming material.

The male web ML as shown in FIGS. 10 and 11 also comprises a plurality of nylon monofilaments 24 which extend transversely of the adhesive beads 14. The lengthwise spacing between the adjacent monofilaments 24 is chosen so as to provide the fastener element with hooks sufficiently close together to serve the intended purpose. For a better understanding of the invention certain typical dimensions will be given throughout this specification although it is to be understood that the invention is not limited to these particular dimensions. For example the male web ML shown in FIGS. 10 and 11 may be made up of nylon strips 20 which are 0.065" wide with beads 14 which are approximately 0.032" wide and 0.020" high.

The parallel beads 14 are spaced, center to center, by 0.300". The monofilaments 24 may have a diameter of 0.008" and they may be spaced along the beads 14 at intervals of about 0.09". These typical dimensions will result in a final product as illustrated in FIG. 9 in which there are about 12 hooks per inch of lineal lengths of the fastener element and about 16 hooks per inch of width as viewed in FIG. 9. Such lateral and longitudinal spacing of the hooks on the finished product has been selected for illustration merely because it is similar to one form of the well-known Velcro fasteners made in accordance with U.S. Pat. No. 3,009,235 to De Mestral. It will be apparent that the spacing may be varied as desired.

The male web ML shown in FIGS. 10 and 11 is prefabricated by the use of suitable equipment, not shown, on which the nylon strips 20, with beads 14 thereon, are spaced at the desired distance from each other. The strips are heated to soften the beads and the nylon monofilaments are laid across and pressed into the softened beads 14. For purposes of illustration it is assumed that the width of the final product is to be ten inches. In that case the strips 20, 14 will be positioned on 0.300 centers with eight strips provided for each inch of width of the final product. Thus the width of the original prefabricated sheet ML would be 8 x 10 x 0.300 or 24".

The nylon monofilaments 24 may be assembled with the strips 20, 14 by lapping them across the preheated strips 20, 14. Alternatively the monofilaments may be wound upon a mandrel to form a helix having a pitch such as to space successive turns by the chosen distance for longitudinal spacing of the final hooks. The circumference of the mandrel, for the typical dimensions assumed herein, may be 24" or any multiple thereof. The strips 20, 22 are preheated to softening temperature for the beads 14 and are fed to the mandrel axially thereof and ahead of the winding point so that the helix of monofilament is wound onto the softened beads 14. Upon cooling of the adhesive the now tubular fabric progresses off the mandrel and is slit to form a flat sheet or several flat sheets each of 24" width, for example. As will be observed in FIG. 11 the nylon monofilaments 24 are embedded in the beads 14 and in the coating 22 integral with the beads 14 so as to form with the strips 20, 14, a fabric-like web structure which, of course, may be of indefinite length. Such prefabricated web ML preferably is wound on spools and is supplied to the machine of the present invention from time to time as required.

Figure 12:
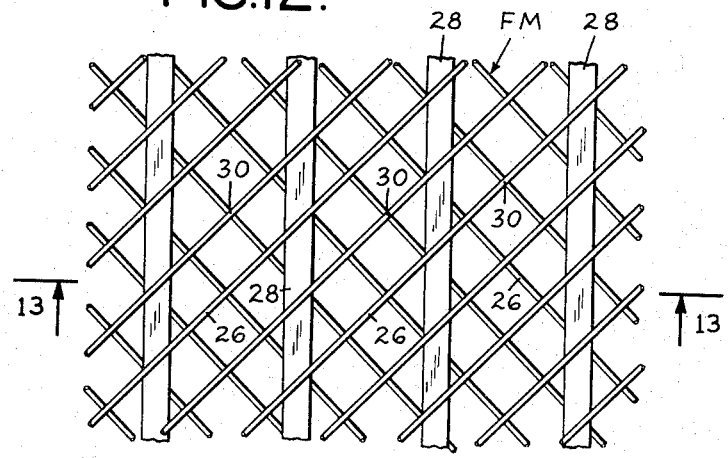
FIG. 12 is a greatly enlarged fragmentary plan view of a prefabricated web of hook-enmeshing material.
Figure 13:
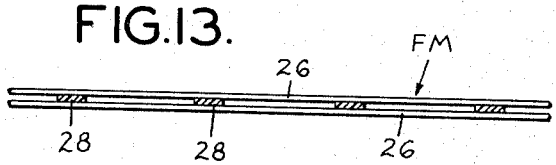
FIG. 13 is a vertical sectional view along the line 13—13 of FIG. 12.

The female web shown in FIGS. 12 and 13 is also a prefabricated web made on equipment not shown in the present drawings. This web is made up of nylon monofilaments 26 and spaced strips of thermoplastic adhesive material 28. As will be apparent from the description herein-below of the machine of the present invention the female web FM as originally supplied to the machine is somewhat narrower than the male web ML but is still wider than the finished product is to be. This is because the female web is not reduced in width to the same degree as the male web when the two are assembled. The spacing between the adhesive strips 28, to go with the male web described above, originally will be 0.190" center to center. The nylon monofilaments 26 are finer than those used in the male web, for example they may be approximately 0.003" in diameter. The adhesive strips 28 may be made from the same Versalon or equivalent thermoplastic resinous material as discussed above in connection with the male web. The adhesive strps 28 may be 0.032" wide for use with the particular set of dimensions herein assumed.

The female web FM may be made up in any desired width by winding the nylon monofilament upon a stationary hollow mandrel having a cylindrical winding portion which merges into a flattened take-off portion with appropriate feed-off means such as belts or chains. A helix of very steep pitch is wound whereby each of the monofilaments will assume approximately an angle of 45° with respect to the longitudinal axis of the mandrel. Obviously a multiple winding head must be provided and a suitable number of individual lengths of monofilaments must be supplied from such head to give the co-spacing between adjacent monofilaments 26 desired for cooperation with the hooks formed from the male web ML. For example the monofilaments 26 may be wound upon centers of 0.025". The helically wound monofilaments 26 may be progressively drawn off the mandrel by the feed-off means as a flattened tubular structure which is then further flattened and assembled with the adhesive strips 28 as it moves away from the mandrel. The proper number of adhesive strips 28, in proper lateral spacing, is introduced into the core of the tube, i.e. by guiding the strips through the hollow center of the mandrel, and when the tube is completely flattened the strips 28 will lie between the upper and lower layers of diagonally crossing monofilaments. The strips 28 may be preheated, or the flattened assembly may be heated, to soften the adhesive of the strips 28 which thus will adhere to the upper and lower layers of monofilaments.

As shown in FIG. 12 the monofilaments 26 which cross above the strips 28 form the upper ply of the flatted tubular structure while those monofilaments 26 which lie beneath the adhesive strips form the lower ply thereof. Monofilaments 26 also cross one another as at points indicated by the reference numeral 30. The filaments 26 are not fastened together at the crossing points 30 since the temperature at which the filaments are adhered to the strips 28 is substantially below the temperature at which the monofilaments 26 will themselves become softened. Thus the female web FM is held together as a stable structure by bonding between the adhesive strips 28 and the monofilaments 26 but all of the lengths of monofilaments which extend angularly between adjacent strips 28 are free to slide relative to one another.

From the dimensions given it will be recognized that each diamond shape aperture defined by the crossing of the monofilaments 26 at points 30 will have a dimension of somewhat less than 0.025" by 0.025". Nevertheless an object of greater cross section may be forced into any one of such openings because the monofilaments 26 will slip relative to one another at the crossings 30 to accommodate such objects. In the present invention the hooks 16 (FIG. 9) have projected dimensions which are somewhat greater than the size of the openings in the female web FM. Thus when the two fastener elements 10 and 12 are brought together the hooks of the one element will penetrate the female web in the other element and after such penetration will be enmeshed with the female web FM. Separation of the fastening elements will be resisted up to a certain point depending upon the stiffness of the hooks 16. Beyond that point the hooks 16, at each point of enmeshment with the female fabric, will yield and straighten out and thus be permitted to withdraw from the female web FM. Separation of the fastener ordinarily will be accomplished by peeling one element from the other.

From what has been said it will be apparent that the fastening elements provided by the present invention operate in a manner which is quite similar to that of the fastener element disclosed in U.S. Pat. No. 3,009,235 De Mestral. In said De Mestral patent the hooks are provided on one element of the fastener while the other element is provided with a multiplicity of loops. In the present invention a single type of hermaphrodite fastener element is capable of intermeshing with identical elements inasmuch as the element has both hooks and relatively movable filaments which serve the function of loops.

The fastener of the present invention is particularly designed for high speed continuous production in automatic machinery and thus is capable of being manufactured at a lower cost than similar fastener elements which are formed by weaving on ribbon looms.

A method and apparatus for the formation of hermaphrodite fastening elements from prefabricated webs FM and ML is shown in FIGS. 1 through 8. Referring first to FIG. 1 it will be observed that the male web ML enters the machine at the left hand end thereof at its full flattened width as manufactured. The female web FM, which is narrower than the male web ML, also enters the machine at its original width and lies above the web ML. As these webs progress to the right through the machine and the various stations thereof the webs ML and FM are progressively narrowed as a result of the forming operations performed on the monofilaments 24 and 26 respectively of such webs. The machine herein disclosed serves to bring the male and female webs progressively into the final conformations and to heat set the monofilaments 24 and 26 of the respective webs in such conformations. Also the machine serves to soften and adhesively unite ribs 14 of the web ML and strips 28 of the female web FM and to secure the properly shaped monofilaments to the backing sheet BS. The machine also serves to cut and physically remove a portion of each of the monofilaments 24 of the male web ML thus to convert the continuous filaments into separate spaced hooks 16 as shown in FIG. 9.

In a general sense the shaping of the monofilaments of the webs ML and FM is performed by tools which are long wire-like endless bands of metal having different specific cross sectional shapes and each of which is conducted through an endless path. The paths of the bands are grouped in accordance with the different functions which they perform. The bands are matching the widths of webs ML and FM where they first engage the webs and progressively converge to change and to bring the webs to the desired final shape and width. Certain of the bands drop out when their function is complete while others conduct the webs through appropriate heat setting, adhesive activating, cutting, and backing sheet applying stations.

Referring first to FIG. 2 the machine of the present invention is shown in diagrammatic form. The tool bands referred to above are shown at A, B, C and D extending through endless closed paths defined by properly located guide rollers. In order to show a separate endless path for each of these bands as well as to show the webs ML and FM they have been shown superimposed and in exaggeratedly spaced relation as they extend through the working stations of the machine. Because of the extremely small cross-sectional sizes of these bands they are shown as single lines in FIG. 2 and even so it is not at all possible to show how these bands converge with one another in a vertical direction as they progress through the operating stations. Accordingly detailed sectional views, FIGS. 3 through 8, are presented in enormously enlarged scale to illustrate the progressive actions of the bands.

In FIG. 2 a spool 38 of prefabricated male web ML is shown supported on a suitable stand 40 The web ML is unwound from the spool 38 and guided over a roller or bar 42 from which it is directed angularly downwardly and beneath an overhead guide roll 44 which presses the web down into contact with the uppermost surfaces of the bands B. The bands B are driven, as will be described below, over a guide roll or bar 45 and into a horizontal plane established by the grooves in a grooved guide plate 46 and a work table 48 which extends toward the right and through the stations in which assembly, heat setting and cooling are performed. The latter stations are indicated generally at 50 and 52. The bands A also are driven, as will be described below, and at the left hand end of the machine they are guided over a roll 54 and into grooves in the guide plate 46 to move generally in the same horizontal plane as that occupied by the bands B. As diagrammatically indicated in FIG. 2 the bands A and B have both entered the grooves of guide plate 46 and thus lie in the proper horizontal plane at the point that the male fabric ML enters under the overhead roll 44.

The bands C are shown as idlers inasmuch as they will be carried through the machine at the same speed as the other bands as a result of being pressed in a portion of their path into frictional engagement with webs ML and FM. However, supplemental driving means may be provided if so desired. The bands C are guided through an endless path, which includes a lower return reach as shown in FIG. 2, and over a guide roll or bar 56 near the left hand end of the machine and a guide bar 58 located beneath the station 50. As the bands C move from the guide bar 58 to the guide roller 56 they are split into two groups beneath the machine in such positions that each group of bands may extend vertically from the guide roll or bar 56 to angularly disposed guide rolls or bars 60 and 62 (see FIG. 1). Thus one-half of the bands C are guided in a vertical path which lies outside the longitudinal edges of the male web ML and pass over the guide bar 60 in a plane above the web ML. The other half of the bands C rise vertically beyond the other longitudinal edge of the web ML and over the guide bar. From the guide bars 60 and 62 the two groups of bands C converge toward one another while the individual bands in each group are fanned out to extend downwardly in an angular path disposed just above the male web ML. Guide bars 64 and 65 having axially spaced circumferential grooves are angularly disposed, as shown in FIG. 1, just above the web ML (FIG. 2) to establish a uniform lateral spacing of the bands C from one another throughout the width of the two reassembled groups of bands as they enter the general plane of the bands A and B.

FIG. 3, taken along the section lines 3—3 in FIG. 2, is a view looking upstream of the movement of bands and webs through the machine. In FIG. 3 there is shown the grooved guide plate 46 and the actual relationship between bands A and B and the plate 46 as distinguished from the diagrammatic showing in FIG. 2. The grooves 66 and 68 of the plate 46 are of such width and depth as to receive and serve as precise guides for each of the individual bands A and B respectively and these grooves converge to bring the fanned-out bands together. The upper surface 70 of the grooved plate 46 continues at the horizontal level shown in FIG. 3 approximately to the section line 4—4 in FIG. 2. Downstream of the latter section line the surface 70 curves downwardly as seen in FIG. 2 so as to drop away from the bands A and B just ahead of a downstream point (section line 5—5 of FIG. 2) in the path in which the bands A and B have moved laterally into contact with one another as shown in FIG. 5.

In FIG. 3 the grooves 68 are laterally spaced to correspond with the spacing of the strips 20, 14 in web ML thus bringing a band B directly under each such strip where the web ML passes under the overhead roll 44. From the point at which the section of FIG. 3 is taken to the section line 4—4 of FIG. 2 the grooves 66 and 68 have converged slightly to correspond with the narrowing of the web ML which occurs between these points. From the section line 4—4 to the section line 5—5 of FIG. 2 the grooves 60 and 68 have further converged and also have curved downwardly away from the bands A and B so that the bands may converge progressively from the lateral spacing shown in FIG. 3 to that shown in FIG. 4 and eventually to that shown in FIG. 5 wherein the bands A and B are in lateral contact with one another.

Referring back to FIG. 3 it will be observed that the bands B extend vertically upward to terminate in narrow, slightly rounded, upper surfaces 72 which are precisely spaced laterally so as to receive substantially the exact longitudinal center of each of the nylon strips 20 forming a part of the assembly 20, 14 of the male web ML. The bands A extend upwardly to terminate in relatively broad flat surfaces 74 lying substantially below the plane of the uppermost surfaces 72 of the bands B.

Still referring to FIG. 3, it will be observed that the bands C which have been properly spaced by grooved bars 64 and 65 now lie directly above each of the bands A. The bands C are provided with downwardly extending longitudinal flanges 76 which are smoothly curved and with a central depressed portion 78. The bands C and A thus are so contoured that when the bands C move downwardly toward the bands A the monofilaments 24 of the male web ML will be progressively formed into a conformtion preparatory to being made into hooks. In the position of parts illustrated in FIG. 3 a band C has just touched the central portion of each of the spans of monofilament 24 which extend from tip to tip 72 of the adjacent band B.

As the parallel assembly moves from the position shown in FIG. 3 to that shown in FIG. 4 the female web FM is guided downwardly to lie above the bands C and to fall into contact with the strips 20, 14 of the male web ML. The female web also is registered laterally in such manner that the adhesive strips 28 forming a part thereof fall into exact vertical registry with the adhesive beads 14 on the male web ML. This is accomplished as shown in FIG. 2 by supplying the female web FM from a spool 80 which may be supported upon the stand 40. From the spool 80 the web FM moves upwardly and over a guide roll or bar 82 and thence downwardly in an angular direction to a guide roll 84 beneath which it passes to be pressed down upon the upper surfaces of the bands C. Immediately downstream from the guide roller 44 the bands D are brought down upon the upper surface of the female web FM. To this end the bands D are guided in an endless path which lies above the plane in which assembly occurs. As shown in FIG. 2 the bands D move downwardly from a guide roll or bar 86 to a guide roll or bar 88 the lower surface of which is so located as to position the bands D in contact with the upper surface of the web FM. One or both of the rolls or bars 86 and 88 are grooved circumferentially to hold the bands D fanned out and in exact vertical registry with the bands C which lie beneath the web FM. At this point the female web is only very slightly depressed by the bands D whereby it remains substantially at the width to which it was prefabricated. Immediately downstream of the guide roll 88 as shown in FIG. 2 there is provided a series of guide rolls 90 which are located on progressively lower horizontal axes so as to press the bands D progressively down into the position of parts shown in FIG. 5 wherein the last of the guide rolls 90 is shown in the lowermost position to which the bands D are depressed.

In FIG. 5 which, as indicated by the section line 5—5 in FIG. 2, is a view looking upstream from a point beyond the end of guide plate 46, the bands A and B have come into lateral contact with one another throughout the width of the machine. Such final convergence of the bands A and B is caused by a pair of side guide rollers 92 (see FIG. 1) mounted on vertical axes and so laterally spaced as to firmly press the bands A and B together throughout the width of the machine at this point. Additional, similar guide rolls 94 are provided at suitable intervals throughout the zones of the machine in which the bands A and B are to remain in the closely compacted position illustrated in FIG. 5. The bands C and D, which have been moved downwardly between portions of bands A and B, will converge with the latter.

Referring now to FIG. 5 it will be observed that the webs ML and FM have been brought into a final position in which hook forming portions have been formed in the monofilaments of the web ML and the intermediate hook engaging portions have been formed in the web FM. To this end the monofilaments of the web ML have been sungly conformed to the upwardly extending side portions of each of the bands B and the nylon strips 20 have been snugly conformed to the narrower upper extremities and over the top surfaces 72 of bands B. Also the monofilaments 24 of the web ML have been curved downwardly around flanges 76 of the bands C and then upwardly and across the flat top portions of the bands A, imparting a generally W-shaped conformation to each of the strands 24.

Still referring to FIG. 5 the female web FM has been pressed downwardly to become embedded in the adhesive material of beads 14 of the male web ML. The monofilaments 26 of the web FM, arranged in the crisscross pattern shown in FIG. 12, have been contoured downwardly alongside the bands B and across the flat upper surfaces of the bands C against which they are held firmly by the bands D. Thus the mating surfaces of bands C and D form the hook engaging intermediate level portions designated by the reference numeral 32 in FIG. 9.

The shaping of the webs ML and FM as just described has been carried out at a temperature appropriate for softening of the adhesive elements 14 and 28 respectively of those webs but at a temperature below the melting points of the nylon multifilaments 24, 26. Thus, the machine includes an enclosure 98 separated from the zone 50 by a vertical baffle 96. Enclosure 98 generally surrounds various guide rolls and bars as well as portions of the webs ML and FM and the bands A, B, C and D before they enter the zone 50. Within the enclosure 98 a temperature is maintained to preheat the bands and the webs ML and FM to a desired degree preferably to the softening point for the adhesive components 14 and 28 of the webs. Heating is provided by any suitable means, not shown, and may comprise radiant heating elements or heated air or other gas circulating within the enclosure 98. The enclosure 50 is also provided with means, not shown, to heat the bands A, B, C and D, the webs ML and FM to appropriate temperatures. It is preferred to use inductive heating in the zone 50 and for this purpose the bands A, B, C and D preferably are made of steel having stainless properties and capable of being heated inductively in an electromagnetic field. When this is done, induction coils (not shown) may be positioned in the enclosure 50, for example they may be mounted in suitable recesses in the table 48, to transfer energy to the bands and thus to heat them very rapidly so that they, in turn will transfer heat to the nylon and adhesive components of the webs ML and FM. Illustratively the temperature of the webs FM and ML is progressively raised in the zone 50 to facilitate the forming of the monofilaments and so that when the webs reach the section line 5—5 of FIG. 2 they have reached a temperature appropriate for heat-setting the nylon monofilaments. Obviously the particular setting temperature will be selected with regard to the particular nylon used for the monofilaments 24 and 26 of the webs ML and FM, although a temperature of about 350° F. is appropriate for many commercial forms of nylon monofilament.

The temperature of the formed webs ML and FM is maintained at heat-settling level throughout the portion of the zone 50 which extends to the right of section line 5—5 in FIG. 2. The retention time within zone 50 should be long enough to assure heat setting of the nylon monofilaments, for example it should be about six seconds or longer. Therefore the length of zone 50 must be such, with regard to the lineal speed of the machine, as to provide the required retention time. Throughout the zone 50 the bands A, B, C and D and the webs ML and FM remain in the relative positions shown in FIG. 5 and to this end there is provided a series of hold down rolls 100 which rest upon the tops of bands D and cooperate with the lateral guide rolls 92, 94 to hold the moving assembly accurately upon the table 48.

In zone 52 the assembly is similarly held by hold down rolls 102 and lateral guide rolls 94. Zone 52 is a cooling zone wherein the temperature of the bands A, B, C and D and of the webs ML and FM is lowered as rapidly as practicable to a level of say 0° F. to complete the setting of the nylon components. Refrigerated air or other gas may be supplied to the lower chamber 104 of zone 52 to flow upwardly through holes 106 formed in the table 48. Referring now to FIG. 5, for example, it will be noted that each of the bands A and B have openings 108 and 110 respectively extending vertically through the base portions of the bands so that the refrigerated air supplied in zone 52 may flow upwardly through said openings to be directed upon the monofilaments and bands C and D. The openings 108 and 110 preferably are mating and semicircular in cross section. They are formed at closely spaced intervals throughout the length of the bands A and B as will be disclosed in greater detail below.

Figure 6:
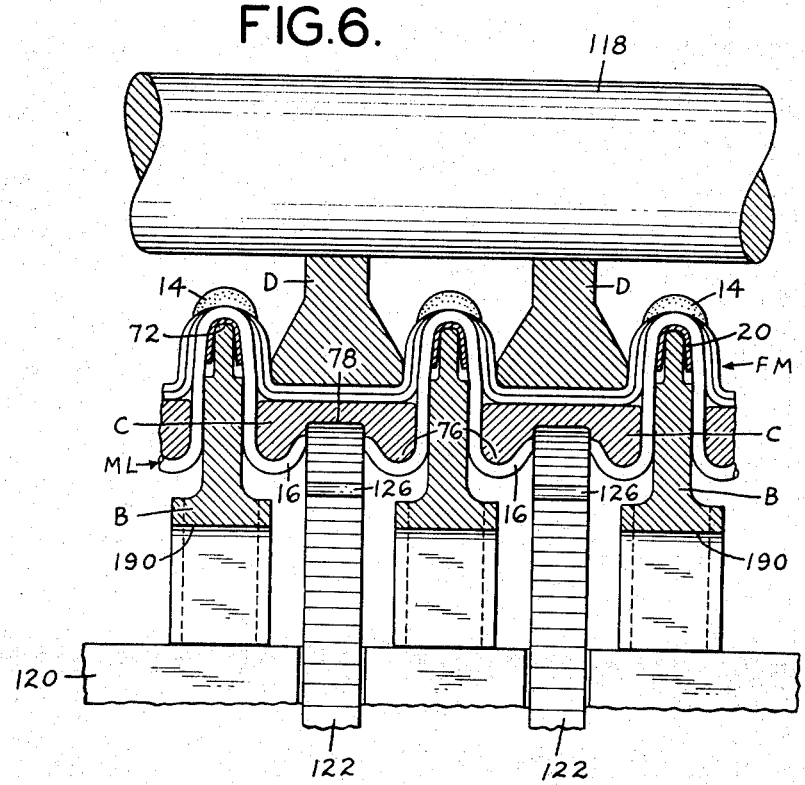

After retention in zone 52 for sufficient time to assure that the bands and webs have been thoroughly chilled the assembly emerges from zone 52 to pass through the main driving station 112 shown in enlarged scale in FIG. 8. While the description will return to this FIG. 8 at a later point it is sufficient for the present to note that the bands A are guided downwardly around the main drive gear 114 to drop out of the moving assembly whereby the latter proceeds to section line 6—6 of FIG. 2 in the arrangement shown in detail in FIG. 6. Referring now to FIG. 6 it will be noted that the spaces formerly occupied by bands A are now open to the bottom of the assembly to provide access to the shaped and chilled monofilaments 24 of web ML. FIG. 6 is a fragmentary vertical transverse sectional view through a cutting station indicated generally at 116 in FIG. 2. Referring briefly to FIG. 2 the cutting station 116 receives the assembly of remaining bands B, C and D and the webs ML and FM which is held down by a roller 118 against the top of an enclosure 120 containing cutting mechanism which operates upon the monofilaments 24 of web ML while such monofilaments are still chilled and thus are relatively brittle. The cutting mechanism illustratively shown herein comprises a plurality of high speed small circular saw blades 122 (see FIG. 6) although it may be preferred to utilize a plurality of ultrasonic vibratory cutting tools for this purpose.

Referring again to FIG. 6 it will be observed that each of the saw blades 122 is of sufficient width to remove, or destroy, the portion 126 of the nylon monofilaments 24 which previously had extended horizontally across the tops of the bands A (compare FIGS. 5 and 6, for example). The removal of the segments 126 thus leaves the hooks 16 in the separate, oppositely facing pairs as shown in FIGS. 6 and 9. When an ultrasonic cutting device is used a vibratory hammer of such device is provided in each of the spaces instead of the saw blades 122 as shown in FIG. 6.

Referring now to FIG. 2 it will be observed that the upper set of bands D is guided upwardly around a guide roll 128 located just beyond the cutting station 116 and then over a guide roll 130 to enter the return portion of the endless path of said bands. The remaining bands B and C with the assembled and heat set webs ML and FM then progress to the final assembly station 132 where the backing sheet BS is applied. The station 132 includes an enclosure 134 having an upper zone 136 and a lower zone 138 separated by a table 140 having vertically extending holes 142. Refrigerated air or other gas is supplied to the lower zone 138 to flow upwardly through holes 142 and to impinge upon the assembly of bands and webs to keep all elements thereof cool except for the particular zones to which heat is applied by a heating or sealing device 144 located in the upper zone 136. Suitable hold down rolls 146 also are located in the upper zone 136 for a purpose to be described.

Still referring to FIG. 2, the backing sheet BS is supplied from a spool 148 mounted on a suitable stand 150. The sheet BS is guided over rolls or bars 152 and 154 and thence forwardly into the station 132 to lie upon the assembly of bands B and C and webs ML and FM.

In FIG. 7, which is a vertical section looking upstream from the section line 7—7 in FIG. 2 the ultrasonic heating or sealing device 144 is shown, diagrammatically, as including vibratory hammers 156 there being one hammer for each of the adhesive beads 14 forming a part of the male web ML. The backing sheet BS which has entered station 132, as described above lies beneath the hammers 156 and on top of the adhesive beads 14. The hold down rolls 146 will press the backing sheet BS into firm engagement with the beads 14 and vibration of the ultrasonic hammers 156 will soften the beads 14 locally so as to seal the backing sheet firmly to the assembly of webs ML and FM throughout the lengths of the adhesive beads 14.

When the backing sheet BS is a strip of woven farbic or other porous material such as non-woven fabric or perforated plastic film, the locally softened adhesive of bead 14 beneath the vibratory hammers 156 will penetrate the openings or pores of the backing sheet BS to form a firm bond.

In the ultrasonic sealing operation, just described, the upper ends 72 of the bands B serve as anvils for the hammers 156. If so desired the bands B may be backed up by a toothed roll 157 (see FIG. 2) which meshes with the teeth formed in the bands (not yet described). The roll 157 is located directly beneath the hammers 156 and serve to hold bands B very firmly so as to obtain maximum efficiency from the ultrasonic hammers. The heating effect is very local and particularly when refrigerated air is supplied from beneath the table 140 the heat setting and adhesive bonding previously established is not affected by the final operation of applying the backing sheet BS.

Heating devices other than ultrasonic may be used for the final assembly so long as they are so designed as not to harmfully heat the previously assembled elements of the fastener.

In FIG. 7 there is also shown a detector finger 158 inserted in each space from which a portion 126 (see FIG. 6) of the male monofilaments 24 has been removed in the cutting station 116. The fingers 158 project upwardly through suitable openings in the table 140 and the upper ends thereof terminate within the recesses 78 of the bands C. The fingers 158 are for the purpose of detecting any failure of the cutting device 116 to remove the portions 126 of monofilaments 124 which must be removed to separate the hooks 16. Thus, all of the fingers 158 may be secured to a rock shaft, not shown, which will operate an electric switch to deenergize and preferably brake the machine to a stop whenever an uncut monofilament is detected by any of the fingers 158. Alternatively each finger 158 may comprise an actuating arm for an independent microswitch or equivalent. With the latter arrangement the detection by any one or more of the fingers 158 of an uncut monofilament not only would stop the machine but also could light an indicator bulb or bulbs to show in which row the failure had occurred.

Because of their extremely small size the detector fingers 158 have not been shown in FIGS. 1 and 2. However it will be apparent that they may be located at a point downstream of the cutting station 116 preferably quite close to said cutting station. This is because the machine operates at high linear speeds and it is imperative that the machine come to a stop before an uncut monofilament reaches the point at which the bands C are guided away from the completed fastener assembly.

Referring now to FIG. 2 the hold down rolls 146 downstream of the ultrasonic sealer 144 serve to hold the backing sheet BS against the adhesive beads 14 while the latter cool and solidify through the remainder of station 132. As the assembly emerges from station 132 the bands B are guided downwardly around a guide roll 160 to another guide roll 162 and thus into the return portions of their endless paths.

The completed fastener assembly and the bands C then enter a final cooling station 164 including an enclosure 165, an upper chamber 168 and a lower chamber 166 separated by a table 170 having holes 172 for the passage of refrigerated air or other gas from the lower chamber 166 to the upper chamber 168 thus to cool the final assembly. This final cooling station may not be needed when ultrasonic sealing of the backing sheet BS is practiced but may be needed for other types of sealing or when the machine is operating at very high speeds.

As the final assembly and bands C emerge from station 164 the bands C are guided downwardly away from the fastener assembly over a guide roll 170 to another guide roll 172 and thus to the return portion of the endless paths of bands C. From a consideration of FIG. 7 it will be noted that the bands C are located inside the hooks 16 and it will be apparent that the hooks will bend downwardly to permit bands C to be withdrawn after which the hooks will spring back to their heat-set position. If any pair of hooks 16 were still to be connected as a result of failure of the cutting station 116 the bands C could not be removed without damage to the product. However the detector fingers 158 are located well upstream of the point at which the bands C must be withdrawn thus affording ample time for slowing and stopping of the machine after detection of an uncut monofilament 24. The machine then may be inched forward to bring the uncut filament to an accessible point at the exit of station 164.

The completed fastener assembly 174 leaves the station 164 and may be wound upon a reel 176. The completed fastener assembly thereafter may be slit into appropriate widths and cut into lengths suitable for use as fastener elements like those shown at 10 and 12 of FIG. 9. From FIG. 9 it will be apparent that the monofilaments 24 and 26 of the webs ML and FM are now firmly embedded in the combined and coalesced adhesive material supplied in the form of beads 14 and coating 22 of the web ML and the strips 28 of web FM. The nylon strips 20 of web ML are now permanently heat set in the form of elongated channels firmly secured to the monofilaments and serving to reenforce them. The monofilaments are heat set in the forms of male hooks 16 and the intermediate female mesh portions 32.

The nylon strips 20 have also served an important function in the assembling operation. By referring to FIG. 5, for example, it will be noted that the nylon strips 20 are in contact with the upper ends of bands B and that they are interposed between these bands and the adhesive material of beads 14, coating 22 and strips 28. Thus there is no danger of the adhesive material sticking to the bands B during any of the heating operations. The bands A, B, C and D at all other points are in contact only with the nylon monofilaments 24 and 26 which are not heated at any time to such a temperature as to become tacky.

Referring now to FIG. 8, which is a vertical sectional view taken generally along the line 8—8 of FIG. 1, it will be noted that the plane of the section in particular coincides with the vertical centerlines of a set of bands A, C and D. The right hand portion of FIG. 8 is broken away so as successively to reveal that the bands D are guided upwardly from the assembly beyond station 116 and that the bands C and B continue to move with the webs ML and FM through station 132 and that bands B and C are successively guided downwardly at subsequent points.

FIG. 8 primarily shows the driving station 112 in which the bands A and B are positively driven in a lengthwise direction to establish the linear speed of operation of the machine. The station 112 may be the only driving station required although, as mentioned above, it may be found desirable to provide supplemental driving means for certain of the bands such as bands C which have long and unequal paths due to the splitting thereof into groups to clear the incoming web ML. Preferably the drive or drives are powered by separate electric motors with highly accurate speed controls, synchronized in the event more than one motor is used.

The bands A, B, C and D are each several feet long but the maximum cross-sectional dimension of any of them is very small. For example, to manufacture a fastener of the illustrative dimensions given above the maximum cross-sectional dimension of any band is only slightly more than 0.10″. Therefore they resemble and can be handled like wires or thin band-saw blades and can be bent around guide rolls and the like in any direction so long as the radius of any such bending is reasonably related to the cross-sectional dimensions. In FIG. 8 the sizes of the bands have been exaggerated with respect to the other parts and the bends shown therein are not intended to be properly related with the bands.

In FIG. 8 there is shown the main driving gear 114 which has an axial length such as to span the full width of the machine. The gear 114 is mounted on a horizontal axis 180 and is provided with a very large number of fine teeth 182 much smaller in relation to the diameter of the gear 114 than is shown in FIG. 8. Each band A and B has formed on the lower edges thereof a series of teeth 184 and 186 respectively to mesh with the teeth 182 of gear 114. Tooth openings 188 and 190 between the teeth 184 and 186 respectively are shown in this figure as well as in FIGS. 3 through 7. A hold-down roll 192 is provided to press the bands and assembled webs ML and FM downwardly to assure firm engagement of the gear teeth 184 and 186 with the gear teeth 182.

As already indicated the bands A are guided downwardly around the gear 114 to enter their return paths. Thus, in FIG. 8 the toothed lower portions of bands B, which continue in a horizontal path, come into view to the right of gear 114 and below the bands C and D. FIG. 8 is broken to omit the cutting station 116 and resumes to show the roll 128 about which the bands D are guided upwardly to enter their return paths. FIG. 8 is then broken again to omit station 132 and resumes to show the roll 160 around which the bands B are guided downwardly to enter their return paths. FIG. 8 is then broken again to omit station 164 and resumes to show roll 170 around which the bands C are guided downwardly to enter their return paths. Thus the right hand portion of FIG. 8 progressively reveals the disposition of the formed webs ML and FM and backing sheet BS as the various bands drop out leaving the completed fastener element assembly to be guided to the spool 176.

From a consideration of FIGS. 8 and 9 it will be apparent that the final product is a fastener device or a master web of fastening device stock, of hermaphrodite type comprising a base sheet BS of flexible material having firmly secured to it the female web FM, which has hook-engaging areas 32 lying in a plane parallel with the plane of the backing sheet BS, and hooks 16 which project generally vertically from the base sheet BS and protrude beyond the plane of the portions 32 of the web FM. As described above the final product, when it is a master web may be slit and cut to form individual fastener elements of appropriate widths and lengths for various needs. Each element is adapted to be engaged with and disengaged from a similar element as shown in FIG. 9 as a result of meshing and unmeshing of the hooks 16 and hook engaging portions 32 of both fastener elements.

The bands A, B, C and D of the forming machine may be manufactured in any suitable manner. For example they may be formed by progressive rolling operations on wire stock of appropriate material and size to establish the cross-sectional shapes shown herein. The teeth 184 of bands A and 186 of bands B may be formed by milling the bands after they have been rolled to proper cross-sectional shapes. The ventilating openings 108 and 110 also may be milled as slots of semi-circular cross section in the bands A and B respectively. The latter openings need not be related in spacing, position or number with the teeth on the bands nor is it necessary that the openings 108 and 110 in adjacent bands A and B fall into registry with one another as the bands pass through the various stations.

The final product which is made from the webs ML and FM shown in FIGS. 10 and 12 respectively will have longitudinally extending rows of hooks 16 (see FIG. 9) in which the hooks in each row extend oppositely from one another and substantially transversely of the longitudinal axis of the adhesive strips 14. They are not precisely transverse since the web ML in the form described above is made up by winding the monofilaments 24 in helical form from a single length of monofilament. It is possible to wind the monofilaments 24 from a plurality of parallel lengths of monofilament, somewhat in the manner that the web FM is wound, thus forming helices of steeper pitch whereby the hooks 16 in the final product will be disposed somewhat diagonally with respect to the adhesive strips 14. Also the web FM as shown in FIG. 12 has monofilaments 26 which cross at approximately 45° with respect to the adhesive strips 28. This angle is not critical, although it will be recognized that a generally diagonal relationship required in order that the spans of monofilament 26 between adjacent adhesive strips 28 do not become unduly long.

In any event the fastener elements 10 and 12 of FIG. 9 will securely engage with one another whether the rows of hooks 16 on both elements happen to lie parallel, as shown in FIG. 9, or happen to be crossed at any angle, including a right angle. Thus the final product may be used in the form of elongated strips to be brought together to close an elongated seam or it may be used in the form of square tabs which need not have any specific orientation when brought together.

The apparatus disclosed herein is particularly useful for the manufacture of fastener elements of hermaphroditic form. However it may be used to manufacture fastener elements of female or male type, if so desired, without substantial modification. Also, in instances where it may be desired to manufacture male elements or female elements only on a particular machine the machine may be simplified by omitting certain parts or functions. The machine, as disclosed will manufacture a male fastener element having hooks 16 only if the female web FM is omitted. In that event the hold down rolls 90, 100, 102 and 146 may be lowered slightly to press the bands D (see FIGS. 3 and 4) directly upon the bands C whereby the male web ML may be formed and cut to provide rows of hooks 16 which will be secured to the backing sheet BS by the adhesive strips 14. To form a female fastener element the web ML will be omitted and the hold-down rolls aforesaid will be lowered to press the bands C directly upon bands A. In such event the cutting station 116 (FIGS. 2 and 6) may be deactivated and the adhesive strips 14 and nylon strips 20, which ordinarily are prefabricated with the web ML, should be prefabricated with the female web FM. If the machine is intended only for the manufacture of female fastener elements the cutting station 116 may be omitted.

As will be apparent from the foregoing description particular processes or types of apparatus for the production of the prefabricated webs ML and FM do not form a part of the present invention although the use of such webs or their equivalents in the forming of a pile-like fabric product does form a part of this invention. It has been suggested above that both webs ML and FM may be formed by winding upon mandrels and such procedure is believed to be preferable since it is a smooth continuous operation and does not involve the use of reciprocating, stop-and-start devices such as shuttles. However it is pointed out that the webs ML and FM may be formed by operations such as weaving, lapping or, particularly in the case of the female web FM by netting or braiding. In the production of wholly-woven fastener elements, for example under De Mestral U.S. Pat. 3,009,235, the base fabric is a very tightly woven construction of warp and weft yarns which requires an enormous number of excursions of the shuttles per unit length of product. To these warp and weft yarns there are added special warp yarns from which the hooking elements or the looping elements are formed. In contrast with this the webs ML and FM of the present invention are quite open mesh-like constructions requiring many fewer shuttle excursions per unit length of the product.

From a consideration of FIGS. 3 and 4 it will be apparent that the lateral spacing of the adhesive beads 14 and reinforcing strips 20 of the web ML as well as the lateral spacing of the adhesive strips 28 of the web FM is reasonably critical inasmuch as these elements of the webs must fall into reasonably accurate alinement with one another and with the bands B of the machine illustrated herein. While the lateral spacing of the elements just discussed need not be as precise as is illustrated in the drawings it will be recognized that reasonable accuracy must be maintained. Appropriate accuracy may be achieved by the mandrel forming systems described above or with lapping devices in both of which the longitudinally extending elements 14, 20 and 28 may be accurately maintained in position.

While the spacing of the elements 14, 20, 28 is reasonably critical the spacing of the filaments 24 or 26 relative to one another is not particularly critical whereby it may be preferable to assemble the filaments 24 or 26 in a loosely related lapped, woven, netted or braided pattern and then to add the adhesive strips and other longitudinally extending elements in a subsequent operation where such elements may be held under accurate control.

Prefabrication of the webs ML and FM is believed to be preferable for practical reasons. It is possible to arrange the mandrels or other devices upon which such webs are formed as integral parts of the present machine whereby continuous production from creels to final product can be practiced. From a practical standpoint, however, any mechanical difficulties or breakdown of either the web forming or fastener producing portions of the machine would require shutdown of the entire process. When the webs ML and FM are prefabricated on separate equipment a backlog of such prefabricated webs may be maintained. It is preferable that the conditions of production and storage of the webs ML and FM be very closely controlled in so far as temperature and humidity is concerned in order to avoid danger of misalinement due to expansion or contraction of the filaments.

The female web FM illustrated herein embodies monofilaments 26 as a preferred construction. However continuous multifilament yarns also may be used. Multifilament yarns of high twist will operate much like the monofilaments. Multifilaments of very low twist also can be used in which event the individual filaments will tend to separate within the spans lying between adhesive strips 28 thus to form a multitude of very thin, discrete hook-enmeshing elements somewhat similar to the woven loop elements disclosed in the De Mestral U.S. Pat. 3,009,235.

The use of heat sensitive adhesive such as the Versalon materials described hereinabove is preferred. Such adhesives are obtainable in forms which soften and adhere readily but still do not lose their original shape, even when heated to heat setting temperatures for the nylon or other synthetic material utilized for the filaments. Such shape retention may be enhanced, if necessary or desirable, by adding filling material to the adhesive, for example a certain amount of floc may be compounded with the Versalon or other adhesive for this purpose.

The use of contact-type adhesive materials instead of heat sensitive adhesive materials is within the scope of the present invention. For example the adhesive beads 14 as well as the adhesive strips 28 of the webs ML and FM respectively may comprise a contact-type adhesive which will adhere only to itself under pressure alone. In that event the backing sheet BS may be supplied with appropriately spaced strips of similar contact-type adhesive. When such adhesives are used heat is not required for the adhesive materials, although it still may be required for stabilization of the filaments. Also the final adherence of the backing sheet BS to the saped filamentary structure may be caused by pressure rather than by the ultrasonic hammering devices herein disclosed.

What is claimed is:

1. Apparatus for the manufacture of continuous lengths of flexible fabric having pile-like protuberances comprising means for moving a continuous substantially flat fabric-like web comprising a plurality of filaments extending at angles generally transverse of the length of said web through a web path which extends lengthwise of said web, a plurality of means moving with said web in said web path for engaging said web at spaced points lying in a common plane along the transverse lengths of said filaments, means defining an individual path for each of said engaging means said individual paths including portions which converge laterally of the path of said web, a plurality of filament shaping means, means for moving said filament shaping means into contact with portions of said filaments which are intermediate of said points of engagement of said web with said engaging means, means for pressing said filament shaping means and said intermediate portions of said filaments progressively out of said common plane and between said engaging means as the paths of the latter converge to impart to each of said filaments a predetermined shape with said intermediate portions bulging away from said spaced points of engagement, and means for securing a continuous web of flexible backing sheet material to said shaped filaments to form a flexible fabric comprising said base sheet with said shaped filaments attached thereto in the form of pile-like protruberances.

2. Apparatus in accordance with claim 1 in which there is provided means for guiding said continuous web of backing sheet material into contact with said shaped filaments at said spaced points of engagement and in which said means for securing said backing sheet to said filaments is effective to secure said backing sheet to said filaments at said points of engagement.

3. Apparatus in accordance with claim 1 in which said engaging means and said filament shaping means each consists of a set of discrete endless flexible metal bands and in which said means defining an individual path for each of said endless bands comprises guide rolls around which said bands are guided for lengthwise movement in closed paths and a table having a plurality of grooves one for each of said bands, said grooves including portions which converge with one another and serving to support and guide said bands as they move lengthwise in engagement with said web and converge transversely of said web path.

4. Apparatus in accordance with claim 1 for operation upon a fabric-like web including filaments made of synthetic heat-settable material, in which means are provided in successive portions of said web path for heat setting and cooling said filaments while said filaments are held in said predetermined shape.

5. Apparatus for the manufacture of continuous lengths of flexible fabric having pile-like protuberances comprising means for moving a continuous substantially flat fabric-like web comprising a plurality of lengthwise-extending parallel bodies of potentially adhesive material and a plurality of filaments extending at angles generally transverse of the length of said web and adhesively secured to said bodies at points of crossing through a web path which extends lengthwise of said web, a plurality of means moving lengthwise with said web in said web path for engaging said web at spaced points lying in a common plane along the transverse lengths of said filaments and in registry with the adhesive bodies of said web, means defining an individual path for each of said engaging means said individual paths including portions which converge laterally of the path of said web, a plurality of filament shaping means, means for moving said filament shaping means into contact with portions of said filaments which are intermediate of said points of engagement of said web with said engaging means, means effective in said converging portions of said paths of said engaging means for pressing said filament shaping means and said intermediate portions of said filaments progressively out of said common plane and between said engaging means as the paths of the latter converge to impart to each of said filaments a predetermined shape with said intermediate portions bulging away from the common plane in which said potentially adhesive bodies lie, means for activating said potentially adhesive bodies, and means for pressing a continuous web of flexible backing sheet material into contact with said activated adhesive bodies to form a flexible fabric comprising said base sheet with said shaped filaments adhesively attached thereto in the form of pile-like protuberances.

6. Apparatus in accordance with claim 5 in which said engaging means and said filament shaping means each consists of a set of discrete endless flexible metal bands and in which said means defining an individual path for each of said endless bands comprises guide rolls around which said bands are guided for lengthwise movement in closed paths and a table having a plurality of grooves one for each of said bands, said grooves including portions which converge with one another and serving to support and guide said bands as they move lengthwise in engagement with said web and converge transversely of said web path.

7. Apparatus for the manufacture of continuous lengths of flexible fabric having at least two sets of pile-like protuberances comprising means for moving a first continuous substantially flat fabric-like web comprising a plurality of filaments extending at angles generally transverse of the length of said first web through a web path which extends lengthwise of said first web, a plurality of means moving with said first web in said web path for engaging said first web at spaced points lying in a common plane along the transverse lengths of the filaments of said first web, means defining an individual path for each of said engaging means said individual paths including portions which converge laterally of the path of said web, a first plurality of filament shaping means, means for moving said first filament shaping means into contact with portions of said filaments of said first web which are intermediate of said points of engagement of said first web with said engaging means, means for pressing said first filament shaping means and said intermediate portions of said first filaments progressively out of said common plane and between said engaging means as the paths of the latter converge, means for moving a second continuous substantially flat fabric-like web comprising a plurality of filaments extending at angles generally transverse of the length of said second web into a web path in which said second web is superimposed on the portions of said first web lying in said common plane after said engaging means have partially converged, a second plurality of filament shaping means, means for moving said second filament shaping means into contact with portions of said filaments of said second web intermediate of the points of contact between said first and second webs, means for pressing said second filament engaging means and said intermediate portions of said second filaments out of said common plane and between said engaging means as the paths of the latter continue to converge, the pressing of said first and second filament shaping means and the converging of said filament engaging means serving to impart to the filaments of said first and second webs into predetermined shapes with the intermediate portions of the filaments of said first and second webs bulging away from said common plane by respectively different distances, and means for securing a continuous web of backing sheet material to both sets of said shaped filaments to form a flexible fabric comprising said base sheet with said shaped filaments attached thereto in the form of two sets of pile-like protuberances of differing height.

References Cited
UNITED STATES PATENTS

| | | | |
|---|---|---|---|
| 3,277,547 | 10/1966 | Billarant | 156—435 X |
| 3,345,688 | 10/1967 | Billarant | 18—5 |
| 3,372,080 | 3/1968 | Billarant | 156—435 |

ROBERT F. BURNETT, Primary Examiner

J. C. GIL, Assistant Examiner

U.S. Cl. X.R.

24—204; 156—72, 443; 161—53; 425—66